United States Patent [19]

Marshall

[11] E Re. 31,477

[45] Reissued Dec. 27, 1983

[54] FLAT MULTI-SIGNAL TRANSMISSION LINE CABLE WITH PLURAL INSULATION

[75] Inventor: Joseph Marshall, Toyonaka, Japan

[73] Assignee: Thomas & Betts Corporation, Raritan, N.J.

[21] Appl. No.: 17,491

[22] Filed: Apr. 16, 1979

Related U.S. Patent Documents

Reissue of:

[64] Patent No.: 3,763,306
Issued: Oct. 2, 1973
Appl. No.: 235,723
Filed: Mar. 17, 1972

U.S. Applications:

[63] Continuation-in-part of Ser. No. 163,199, Jul. 16, 1971, abandoned.

[51] Int. Cl.[3] ..... H01B 7/08

[52] U.S. Cl. ..... 174/115; 174/117 F; 174/117 FF; 333/12; 333/243

[58] Field of Search ..... 174/117 F, 117 FF, 112, 174/115; 333/243, 12

[56] References Cited

U.S. PATENT DOCUMENTS 2,708,215 5/1955 Kaganoff .
3,082,387 3/1963 Monelli .
3,179,904 4/1965 Paulsen .
3,239,396 3/1966 Bohannon .
3,361,871 1/1968 Brandt .
3,378,628 4/1968 Garner .
3,459,879 8/1969 Gerpheide .
3,560,893 2/1971 Wen .
3,634,782 1/1972 Marshall .

OTHER PUBLICATIONS

Blodgett et al. "Insulation & Jackets for Polyethylene Cables" in IEE Transactions, Dec. 1963, pp. 971–979.
Burndy "Flat Cable–The Modern Cable System For Electronic Applications" 10/69, Roch. NY.
APC Application of Beckett S.N. 218848, Published 6/8/1943.

*Primary Examiner*—Elliot A. Goldberg
*Attorney, Agent, or Firm*—Robert M. Rodrick; Salvatore J. Abbruzzese; Jesse Woldman

[57] ABSTRACT

A multi-signal transmission line is formed of a flat cable having a plurality of generally parallel conductors embedded in a dielectric core material, with an insulator jacket encasing the flat cable and being made of a dielectric material having a higher dielectric constant than the dielectric core material of the flat cable. The resulting composite transmission line cable insures that substantially all of the transverse electromagnetic propagation field created by the passage of a fast rise time pulse in a signal conductor is confined to the geometric area of the cable and the cable functions in a manner to greatly reduce the far end line-to-line interference (crosstalk) between the signal conductor and adjacent quiet lines.

14 Claims, 10 Drawing Figures

CALCULATION OF $T_0$ FOR THE PROTOTYPE CABLE CA-490 10 FOOT LONG

| INPUT $t_r$ AMPLITUDE PERCENT LEVEL | OUTPUT $t_r$ NORMALIZED FOR $T_0$ WHEN INPUT PULSE IS 90° VERTICAL |
|---|---|
| 10 | .17 |
| 20 | .28 |
| 50 | 1.0 ($T_0$) |
| 60 | 1.65 |
| 70 | 3.06 |
| 80 | 7.09 |
| 90 | 28.8 |
| THE 10% TO 60% $t_r$ IS THUS (1.65-0.17) $T_0$ = 1.48 $T_0$ | |

FOR RISE TIME DEGRADATION MEASUREMENTS, THE FOLLOWING PULSES WERE USED:

| INPUT $t_r$, NANOSECOND | .18 | 1.0 | 5.0 |
|---|---|---|---|
| CORRESPONDING $f_0$, MHz | 1639 | 295 | 59 |
| $f_{MHz}^{1/2}$ | 40.48 | 17.18 | 7.68 |
| $A_{cu}$ dB/100 ft. (= 1.37 $f_{MHz}^{1/2}$) | 53.72 | 22.79 | 10.19 |
| $A_d$ dB/100 ft. (= .008 $f_{MHz}$) | 13.11 | 2.36 | .47 |
| $A_0$, ATTENUATION dB/100 ft. | 66.83 | 25.15 | 10.66 |
| $A_0^2$ | 4466.25 | 632.52 | 113.6 |
| $A_0^2/f_0$ | 2.725 | 2.144 | 1.926 |
| $4.56(A_0^2/f_0)$ | 12.4259 | 9.777 | 8.7827 |
| $T_0$ NANOSECOND FOR 10 ft. | .1242 | .09777 | .0878 |

FIG. 4

AMPLITUDE LEVELS OF A PULSE EDGE WITH 10-90% REFERENCED TO (1)

| AMPLITUDE OF INPUT PULSE RISE TIME | FACTOR WHEN RISE TIME NORMALIZED FOR (1) |
|---|---|
| 10 % - 50 % | .46 |
| 10 % - 60 % | .56 |
| 10 % - 70 % | .68 |
| 10 % - 80 % | .82 |
| 10 % - 90 % | 1.0 |

FIG. 5

SHEET 3 OF 4

PULSE EDGE ATTENUATION OF PROTOTYPE CABLE CA-490, 10 FOOT LONG, CALCULATED AND MEASURED VALUES

| RISE TIME AMPLITUDE | FACTOR PER FIG.4 | TIME PART | | OUTPUT PULSE RISE TIME | |
|---|---|---|---|---|---|
| | | OF $T_0$ PER FIG.4 | OF ACTUAL PULSE RISE TIME PER FIG.5 | CALCULATED | MEASURED |
| | | NANOSECOND | | | |
| PULSE RISE TIME = .18 NSEC. $T_0$ = .12486 NSEC. | | | | | |
| 10 - 50% | .83 $T_0$ | .103 | .083 | 1.86 | .20 |
| 10 - 60% | 1.48 $T_0$ | .184 | .101 | .285 | .25 |
| 10 - 70% | 2.89 $T_0$ | .359 | .123 | .482 | .40 |
| 10 - 80% | 6.92 $T_0$ | .860 | .148 | 1.008 | .80 |
| 10 - 90% | 28.63 $T_0$ | 3.56 | .18 | 3.74 | 2.95 |
| PULSE RISE TIME = 1 NSEC. $T_0$ = .09777 NSEC. | | | | | |
| 10 - 50% | .83 $T_0$ | .081 | .46 | .541 | .60 |
| 10 - 60% | 1.48 $T_0$ | .145 | .56 | .705 | .72 |
| 10 - 70% | 2.89 $T_0$ | .283 | .68 | .963 | .88 |
| 10 - 80% | 6.92 $T_0$ | .677 | .82 | 1.497 | 1.28 |
| 10 - 90% | 28.63 $T_0$ | 2.799 | 1.0 | 3.799 | 3.12 |
| PULSE RISE TIME = 5 NSEC. $T_0$ = .08783 NSEC. | | | | | |
| 10 - 50% | .83 $T_0$ | .073 | 2.3 | 2.373 | 2.50 |
| 10 - 60% | 1.48 $T_0$ | .130 | 2.8 | 2.93 | 2.95 |
| 10 - 70% | 2.89 $T_0$ | .254 | 3.4 | 3.654 | 3.60 |
| 10 - 80% | 6.92 $T_0$ | .608 | 4.1 | 4.708 | 4.60 |
| 10 - 90% | 28.63 $T_0$ | 2.515 | 5.0 | 7.515 | 6.50 |

FIG. 6

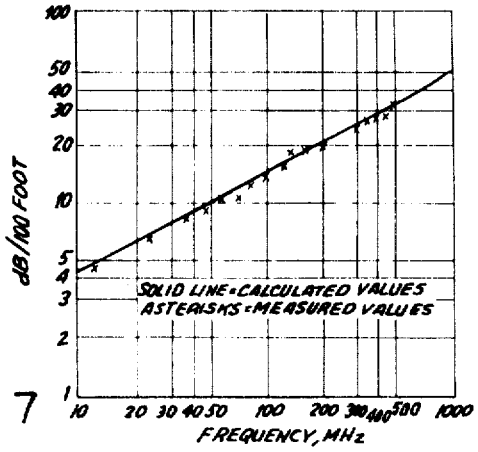

FIG. 7

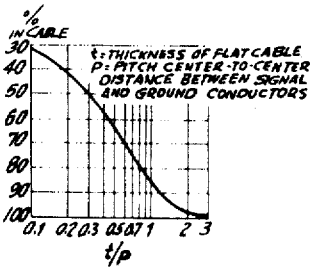

FIG. 10

SINE WAVE ATTENUATION OF PROTOTYPE CABLE (CA-490)

FIG. 8

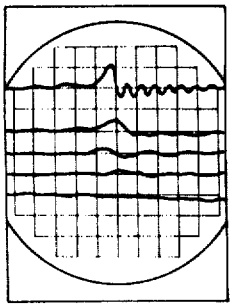

| $t_r$ NSEC. | HORIZ. SCALE NSEC./DIV. | CROSSTALK % |
|---|---|---|
| | CA-490 | |
| 0.18 | 1 | +1.1 |
| 1.0 | 1 | +0.5 |
| 2.0 | 4 | +0.3 |
| 5.0 | 4 | +0.1 |
| 10.0 | 20 | 0.05 |

($t_r$ = PULSE RISE TIME AT ACTIVE LINE INPUT)

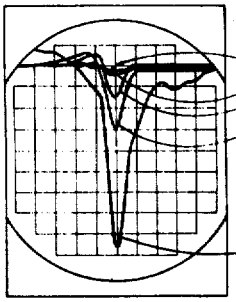

| | | |
|---|---|---|
| | CA-489 | |
| 10.0 | 10.0 | -0.3 |
| 5.0 | 5.0 | -0.6 |
| 2.0 | 2.0 | -1.5 |
| 1.0 | 1.0 | -3.0 |
| 0.18 | 0.25 | -8.6 |

FAR END CROSSTALK MEASUREMENTS ON THE PROTOTYPE CABLE (CA-490) AND ON THE POLYETHYLENE CABLE CORE (CA-489); ONE (1) ACTIVE LINE
LENGTH OF TEST SPECIMENS: 10 FOOT
TEST EQUIPMENT: H.P. 1415A TDR AND RISE TIME CONVERTERS
TEST ADAPTER: ANSLEY'S #604-198
VERTICAL SCALE: 1% CROSSTALK PER DIVISION COMPARED TO THE INPUT PULSE AMPLITUDE

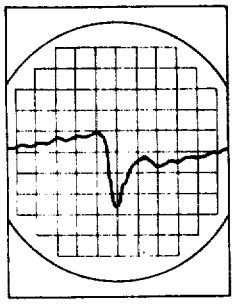

CA-580

$t_r$ = 0.18 NSEC.

CROSSTALK = -2.6%

($t_r$ = PULSE RISE TIME AT ACTIVE LINE INPUT)

FIG. 9

FAR END CROSSTALK ON POLYETHYLENE JACKETED CABLE CA-580, ENCAPSULATING THE BASIC POLYETHYLENE CABLE CORE: CA-489 ONE (1) ACTIVE LINE
LENGTH OF TEST SPECIMEN: 10 FOOT
TEST EQUIPMENT: H.P. #1415A TDR
TEST ADAPTER: ANSLEY'S #604-198
HORIZONTAL SCALE: 0.4 NSEC./DIV.
VERTICAL SCALE: 1% CROSSTALK PER DIVISION COMPARED TO THE INPUT PULSE AMPLITUDE

FLAT MULTI-SIGNAL TRANSMISSION LINE CABLE WITH PLURAL INSULATION

Matter enclosed in heavy brackets [ ] appears in the original patent but forms no part of this reissue specification; matter printed in italics indicates the additions made by reissue.

This is *an application for reissue of U.S. Pat. 3,763,306, issued October 2, 1973, which was* a continuation-in-part application of application Ser. No. 163,199 filed July 16, 1971 by Joseph Marshall entitled "IMPROVED FLAT MULTI-CONDUCTOR CABLE," now abandoned.

The present invention relates to transmission line cables, and more particularly to a composite multi-signal transmission line cable including a multi-conductor flat cable.

For applications where a plurality of signals have to be transmitted through cables in small spaces, flat cable transmission lines have been found to be the best solution. In conventional flat cables alternate ground-signal-ground conductors are positioned side by side in one plane to establish the required transmission parameters: characteristic impedance; velocity of propagation; attenuation; and adequate control of line-to-line interference (crosstalk). Flat cables of the conventional type are being used to a great extent today transmitting signals with rise times of a few nanoseconds only, and performing quite satisfactory at these frequency levels. However, with advancements in the state of the art of sophisticated electronics, conventional flat cables are being pushed to the limit of their capability. More particularly, as an example, the crosstalk from one signal line to the other is often of a magnitude whereby the crosstalk is sufficient to inadvertently trigger or actuate adjacent circuits, as in the case where the cable is employed in a computer. Of course, the interference between the adjacent signal lines increases as pulse rise times become faster. This crosstalk effect is mainly due to the fact that only the central part of the electromagnetic field is propagating within the cable insulation, while the outskirt of the field extends into the immediately surrounding air. As is well known, the ideal medium for signal transmission in a multi-conductor flat cable is a homogeneous dielectric. When the field of propogation is confined within the boundaries of a uniform dielectric material, there is only one propagation velocity in the cable. However, when this field extends beyond the solid dielectric of the cable into the surrounding air, this particular composite dielectric effect introduces several undesirable phenomenon at high transmission line frequencies or fast rise time pulses: (1) distortion of the transmitted signal itself; (2) excessive ringing above the fast crosstalk level at the near end of the adjacent quiet line; and (3) differential crosstalk at the far end of the interconnection. It should be noted that the term "air effect" is a misnomer, and should be more definitively stated as being a "fringing field effect" in that it is the phenomenon of the transverse electromagnetic propogation field extending beyond or infringing upon the field surrounding the dielectric of the core material of the flat cable.

The concept of using a flexible, metallic all-around shield over a flat cable was an early effort in eliminating the fringing field effect and confining the field of propogation for each signal between the adjacent ground conductor and the shield to a homogeneous dielectric.

In order to establish a flexible all-around shield over a transmission line flat cable, it has been known to provide a tight fitting, braided metallic shield around the flat cable without slackening at the wide sides. The wire braided cable was then covered with a yarn braided jacket. The resulting cable thus required both a shield and a covering, thereby increasing the physical dimensions of the cable and the cost of manufacture. To achieve control of the fringing field-effect with less increase in the cable dimensions through a less expensive method is the primary objective of the present invention.

Besides the desirable characteristics of electrical transmission efficiency and flexibility, it is particularly desirable that cables employed in sophisticated electronics also be rugged and flammably self-extinguishing.

Thus, it is an object of this invention to provide a multi-signal transmission line cable exhibiting low crosstalk at fast rise time pulses.

It is a further object of this invention to extend the advantages of the flat cable concept into a field where miniature coaxial cables were previously employed because conventional flat cables were electrically inefficient due to high crosstalk, noisiness, and leakiness.

It is another object of this invention to provide a low cost, multi-signal transmission line cable which is characterized by being self-extinguishing and rugged.

It is still another object of this invention to provide an extremely flexible multi-signal transmission line cable which is also characterized by being self-extinguishing and rugged.

It is still a further object of the invention to provide a low cost multi-signal transmission line structure having desirable electrical and physical characteristics for use in sophisticated electronic equipment.

The composite multi-signal transmission line cable of the subject invention comprises: (1) a central flat cable insulation core having a low dielectric constant, and including a plurality of generally parallel conductors embedded within the insulation; and (2) a surrounding insulator jacket having a higher dielectric constant than the core material. More particularly, the jacket has distinctly different electrical and physical properties, whereby for electrical reasons it has a higher dielectric constant and a higher dissipation factor, whereas for physical advantages, it is self-extinguishing and has a quality for wear and abrasion resistance and, additionally, seals the composite cable for protection against the environment.

A prototype cable having a polyethylene insulation for the core and a vinyl compound for the jacket has been designed, and consists of 20 signal and 21 ground conductors, the signal conductors being round, whereas the ground conductors are rectangular in crossection. Polyethylene was chosen for the insulator material of the flat cable in that it is relatively cheap in cost, and may be readily formed for use in the manufacture of multi-conductor flat cable. Subsequent to the formation of the polyethylene multi-conductor flat cable, the cable structure is covered, preferably through an extrusion process, with the surrounding jacket of vinyl material which includes the desirable characteristic of being self-extinguishing when exposed to the flame.

The conductor arrangement of the prototype cable has been found to have many advantages: (1) the width of the rectangular conductors is chosen so that the signals may be located in alignment with given conductor terminals, yet establishing the necessary spacing for the characteristic impedance between signals and grounds; (2) the insulation removal (stripping) is easier at the cable ends because both the round and rectangular conductors have uniform height; (3) there is only one ground to terminate between adjacent signals (in conventional round wire flat cables two or more grounds have to be used, partially because of crosstalk control and matching the cable signals to connector terminal locations); and (4) the flat-round arrangement offers an easy identification for signals and grounds, this feature being quite helpful, particularly when signals and grounds will be terminated in two different planes (e.g., to printed circuit boards used as microstrip).

The main electrical parameters for any multi-signal transmission line cable are: (1) characteristic impedance; (2) propogation velocity; (3) attenuation; and (4) line-to-line interference (crosstalk). In the composite multi-signal transmission line cable of the subject invention, the first three parameters are controlled by the cable core which may be made of a polyethylene material, while the last parameter, crosstalk, is limited by the outer insulator jacket, which may be an extruded vinyl jacket. It is noted that the vinyl jacket has a higher dielectric constant than the polyethylene core material. The vinyl jacket substantially eliminates the fringing field or air effect from the surface of the polyethylene core. The basic cable core without the jacket looks and acts very similar to the conventional signal transmission line flat cables. The latter have limitations in handling pulse type signals with 1 nanosecond and faster rise times, the crosstalk between lines becoming prohibitive. In thin cables the pulse edge is also distorted. The reason for these undesirable effects is that the outskirt of the propogation of the transverse electromagnetic field (created by the passage of a signal through a signal conductor) passes through the air or fringing field surrounding the basic cable insulation and, accordingly, conventional flat cables have extremely undesirable limitations in the transmission of high frequency, sine wave signals.

In a properly designed composite multi-signal transmission line cable of the subject invention, this harmful fringing field effect is substantially eliminated. Consequently, the pulse edge is not degraded beyond the attenuation characteristics inherent in the selected conductors and insulation. The near end crosstalk is limited practically to the level of fast crosstalk, while at the far end the differential crosstalk is nearly eliminated, and at least is reduced to a minimum, so as to not inadvertently trigger circuits to which the adjacent lines are connected. For the proper design of the improved composite multi-signal transmission line cable of the subject invention, a formula has been empirically developed for the calculation of the characteristic impedance of the cable, based on the size and spacing or pitch of the conductors, the thickness of the cable core, the thickness of the surrounding jacket, and the relationship between the dielectric constants of the core insulation and the surrounding jacket.

The outer insulator jacket of the multi-signal transmission line cable of the subject invention also contributes to the overall physical features in that it can be designed to establish self-extinguishing properties despite the flammable core material. With a jacket made of vinyl material, the cable becomes more rugged and resists wear and abrasion. For that reason, the multi-signal transmission line cable of the subject invention is suitable not only for interior use, but also for exterior interconnections in communication installations. It has been found that when thin polyethylene cable is embedded into a vinyl jacket, the higher dielectric constant of the vinyl jacket material will materially contribute to the composite dielectric constant (of the jacket and core) by the percentage of the square root of its dielectric constant weighed by its field effect. Consequently, the propagation velocity of the subject cable will be somewhat lower; however, crosstalk still will be confined at higher frequencies where conventional flat cables fail.

In a prototype cable made according to the teaching of the subject invention, the maximum operating temperature of the prototype cable was found to be 60° C., however, the subject cable may be designed with higher temperature insulation materials and offer the same advantages of the prototype polyethylene core cable. The prototype structure was found to be extremely flexible and capable of being bent into a radius equal to the cable thickness and straightened out without any noticeable change; it also may be folded straight back upon itself or in a 45° angle without causing any physical damage, with no detrimental effect on the electrical performance. The prototype cable also passed standard flame tests for self-extinguishing properties.

The above objects and advantages, along with other inherent advantages, will become more apparent upon a reading of the following detailed description of the invention taken in conjunction with the following drawings in which.

Figure 3:
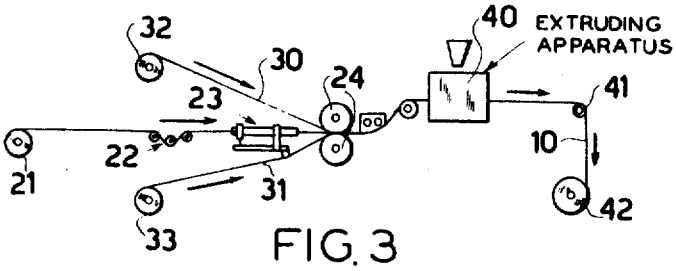

FIG. 3 schematically illustrates apparatus for making the composite multi-signal transmission line cable of the subject invention;

FIG. 4 is a table of calculations for determining the rise time attenuation ($T_o$) of a prototype cable for several input pulses;

FIG. 5 is a tabulation of different amplitude levels of an input pulse to a prototype cable of the type of the subject invention;

FIG. 6 is a tabulation of calculated and measured values of pulse edge attenuation utilizing a prototype cable made according to the teachings of this invention;

FIG. 7 is a graph depicting the sine wave attenuation of the prototype cable in dB/100 feet as plotted against the frequency of the input signals in megaherz (MHz);

FIG. 8 are two oscilloscope tracings depicting the far end crosstalk measurements on the vinyl jacketed prototype cable and on a standard polyethylene cable without a jacket;

FIG. 9 is an oscilloscope tracing of the far end crosstalk measured on a polyethylene jacketed cable, encapsulating a basic polyethylene flat cable core; and FIG. 10 is a graph depicting the distribution of the transverse electromagnetic field in the cross-sectional geometry of the flat cable in terms of the ratio (b/p) of the thickness of the cable core (b) to the center distance between signal and ground conductors.

Figure 1:
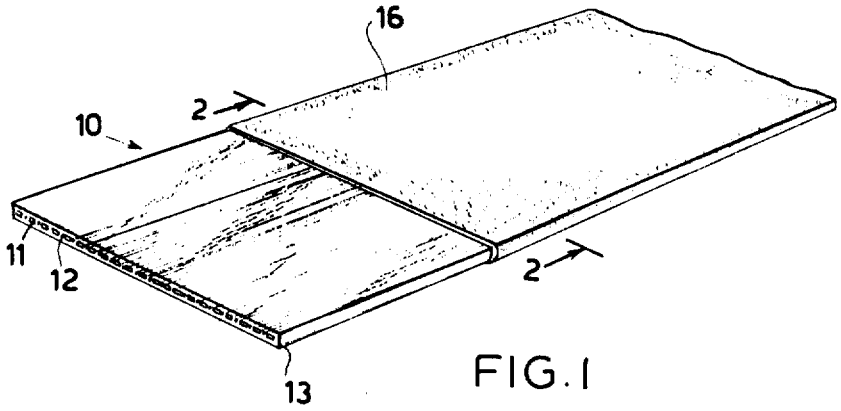
FIG. 1 is a perspective view of the multi-signal transmission line cable of the subject invention, with the outer jacket partially removed from a portion of the cable.
Figure 2:
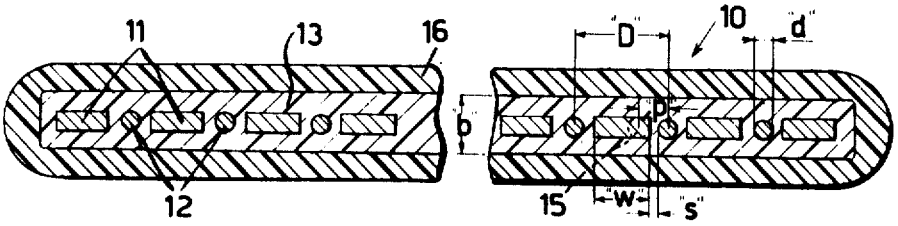
FIG. 2 is a cross-section taken along line 2—2 in FIG. 1.

Referring to FIGS. 1 and 2, the multi-signal transmission line cable 10 of the subject invention is shown as including alternating flat (rectangular) 11 and round 12 wires embedded in a body or core of dielectric material 13, such a polyethylene. Polyethylene is relatively inexpensive, and has a dielectric constant of approximately 2.3. The conductors 11 and 12 are spaced uniformly and generally parallel to each other, with the center-to-center spacing between the conductors being designated as the pitch. As shown in the cross-section of FIG. 2, the round conductors are spaced at a distance "D," with the diameter of the round conductors being designated by the letter "d." The width of each flat conductor 11 is designated by the letter "w," with the spacing between the flat conductors and the round conductors being designated by the letter "s." Assuming that each end of the cross-section of each flat conductor 11 is defined by an imaginary round conductor, (designated by dotted line 15), the center-to-center distance between the adjacent round conductor 12 and the imaginary round conductor 15 is designated by the letter "p." Also, the thickness of the dielectric material in which the conductors are embedded is designated by the letter "b." As indicated previously, the thickness of the dielectric material is of primary importance in order to insure that substantially the majority or a designed part of the field of propagation is contained within the solid dielectric of the cable core. The remaining part is contained within the jacket and little or none is in the surrounding air or fringing field. FIG. 10 shows the field distribution in the cross-sectional geometry of the flat cable in terms of b/p.

Forming a portion of the subject multi-signal transmission line cable 10, and preferably extruded about the entire periphery of said cable, is an insulator jacket or covering 16, preferably made of self-extinguishing material, such as vinyl. The jacket material has a higher dielectric constant than the body of dielectric material 13 in which the conductors are embedded, with the higher dielectric constant jacket material contributing to the composite dielectric constant (i.e., of both the jacket and insulation material 13) by the percentage of the square root of its dielectric constant weighted by its field effect. As a result of this arrangement, the propogation velocity of the multi-signal transmission line cable of the subject invention will be slightly slower; however, this structure will materially contribute to the reduction of crosstalk at higher frequencies.

In a preferred method of making the subject multi-signal transmission line cable, as schematically illustrated in FIG. 3, a plurality of alternating flat and round conductors are unwound from reel 21 and passed through a set of tension rollers 22 through an alignment device 23 into the nip of rollers 24. Also passed into the nip of rollers 24 are upper and lower sheets of dielectric material such as polyethylene, such sheets being designated by numerals 30 and 31, which are stored on rolls 32 and 33. Heat and pressure are applied resulting in the cable structure which is then passed through an extruding apparatus 40 where the vinyl covering 16 is extruded over the cable structure. The composite cable 10 is then passed over roller 41 and stored on storage roll 42. The polyethylene cable core may also be manufactured by extrusion.

The geometry of the resulting cable is of primary importance, with the specific arrangement of the conductors, the thickness of the insulation material in which the conductors are embedded, the relative thickness and dielectric constants of the jacket and embedding material, being of a critical nature to the efficient operation of the subject cable.

The cable 10 embodies a multitude of individual signal transmission lines which are the round conductors 12 that alternate with the flat conductors 11 that are connected to ground. The overall construction of the cable thus provides high density packaging in a single plane, and results in a thin multi-signal transmission line cable structure which is extremely flexible. The insulator jacket 16 is maintained in close proximity to the insulation 13 to insure uniform electrical performance by preventing the presence of air between the jacket and the core insulation 13. If desired, the jacket 16 may be bonded by a suitable adhesive to the core as a further aid in eliminating air from the composite cable.

The electrical parameters of the cable 10 may be controlled individually and in different proportions by the interspersed ground conductors 11 and by the insulator jacket 16. The characteristic impedance will be established depending mainly on the location and shape of the conductors and on the dielectric constant of the cable core insulation and, to a much lesser degree, by the jacket 16, while crosstalk and overall isolation properties are greatly influenced by the insulator jacket 16.

Following is a detailed discussion relative to the electrical features of the subject composite multi-signal transmission line cable.

1. ELECTRICAL FEATURES IN GENERAL

The geometry of a multi-signal transmission line cable made according to the teachings of the invention, wherein the core is made of polyethylene while the jacket is made of vinyl, insures a uniform polyethylene dielectric practically for the total area of the transverse-electromagnetic propagation field. It is noted that the transverse-electromagnetic propogation field is the mode most commonly excited in coaxial and open wire lines.

The main electrical parameters for multi-signal transmission cables in general are:

1. Characteristic impedance;
2. Propagation velocity;
3. Attenuation; and
4. Line-to-line interference (crosstalk)

In a prototype cable, hereinafter designated as prototype cable CA-490, the first three parameters are substantially controlled by the polyethylene cable core, while crosstalk is limited by the special vinyl jacket.

Multi-signal transmission line flat cables of conventional types have a major drawback at fast rise time pulses, i.e., to keep line-to-line interference or crosstalk at an acceptable minimum level. The surrounding air at the outer periphery of conventional cables raises crosstalk and, in particular, far end crosstalk to such levels that loads, such as adjacent circuits, may be triggered unintentionally. The main electrical feature of the multi-signal transmission line cable of the subject invention is to replace this undesirable air or fringing field effect with a layer of dielectric material, and more particularly, a jacket of dielectric material having a higher dielectric constant than the dielectric constant of the core material. The jacket which has a higher dielectric constant and may have a higher dissipation factor than the core material, confines the field of propagation of the individual signals to such a degree that crosstalk will be reduced to an acceptable level for high frequency applications.

It is a criteria of the design of the subject composite multi-signal transmission line cable to select, *for example, by reference to FIG. 10* a geometry for the thickness of the polyethylene core in coordination with the conductor arrangement where the majority of the electromagnetic field will be caused to propagate within the low loss dielectric, and attenuation or propagation velocity will be affected very little by the surrounding jacket. In the prototype design, CA-490, approximately 98 percent of the field propagates in the polyethylene cable core *wherein in accordance with FIG. 10, the ratio of the core thickness to the conductor pitch is about 2.0.*

However, the composite multi-signal transmission line cables of the subject invention may be designed with thinner cable cores with certain trade-offs on the propagation velocity and attenuation. In these designs the higher dielectric constant material of the insulator jacket wil contribute more to the composite dielectric constant by the percentage of the square root of its dielectric constant weighed by its field effect. Consequently, the propagation velocity in such cable will be somewhat slower; still the beneficial electrical effects achieved by the cable of the subject invention will apply and crosstalk will be limited to acceptable levels.

The prototype cable CA-490 was designed for unbalanced systems; however, the basic concept of the subject invention applies as well for balance pair designs and improves crosstalk in both cases.

CHARACTERISTIC IMPEDANCE

The Characteristic Impedance of signal transmission lines depends on the size, shape and location of the conductors and on the dielectric constant of the insulation material. In order to establish a formula with measurable properties, the following basic relationship was utilized:

$$(Z_o)(c)(C)=1$$

where $Z_o$=characteristic impedance, ohms, in air
c=velocity of propagation, meter per second, in air
C=capacitance, Farad per meter, in air A simplified form of this with practical units:

$$Z_o=1.016/C$$

where:

C=capacitance, picofarad per foot, in air

To account for the dielectric material:

$$Z_d=Z_o/(\epsilon)^{\frac{1}{2}}$$

where:

$Z_d$=characteristic impedance in cable
$Z_o$=characteristic impedance in air
$\epsilon$=the effective dielectric constant, relative to air To ease the prediction and calculation of the prototype cable's characteristic impedance a formula was established based upon the dimensions of the cross-sectional geometry:

$$Z_d=1/(\epsilon)^{\frac{1}{2}}42\cosh^{-1}(1.8\times^2-[(1.25\times^2-1)](1.25\times^2-1)^{\frac{1}{2}}$$

where:

x=pd
p=pitch, signal to ground
d=diameter of conductor.

The above formula was found to be in close agreement with actual measurements. It gives direct applicability for multi-conductor cables where both signal and ground conductors are round wires. Therefore, further explanation is needed for the characteristic impedance of flat-round-flat conductor arrangements, the design used for the prototype cable and illustrated in FIG. 1. Since the thickness of the flat conductors is equal to the signal wire diameter and the corners are radial, the following consideration was accepted:

$$p=s+d$$

where:

s=the separation between the round and rectangular conductors

Recognizing the dimensions for the conductor arrangement in the prototype cable:

d=0.0113 inch
s=0.00685 inch
p=0.01815 inch the calculation gives $Z_o$=76.2 ohm characteristic impedance in air.

Having 98 percent of the field propogating in the polyethylene and 2 percent in the insulator jacket, results in a square root of the composite dielectric constant equal to 1.525; consequently, the characteristic impedance of the prototype cable:

$$Z_d=Z_o/(\epsilon)^{\frac{1}{2}}=76.2/1.525=50 \text{ ohms}$$

PROPOGATION VELOCITY

The electromagnetic energy propogates in free space with a velocity of $3(10)^8$ meters per second. Expressing this in more practical units on a time delay base:

$TP_o$=1.016 nanosecond per foot, in air and
$TP_d=TP_o(\epsilon)^{\frac{1}{2}}$ nanosecond per foot, in cable where:
$TP_d$=propogration time in cable.

The signal propogation time in the prototype cable CA-490 is 1.55 nsec./foot. The polythylene cable core without the jacket yields 1.53 nsec./foot propogation delay. These measured results are comparable to calculated values based upon the assumption that 98 percent of the TEM (transverse electromagnetic) field propogates within the polyethylene. These readings were taken at the 10 percent level of the input pulse rise time, $t_r$=0.18 nanoseconds.

ATTENUATION

Signals transmitted through flat cables are attenuated along the lines. This attenuation is due to conductor losses and insulator losses; both are frequency dependent. Copper losses are affected by the square root of frequency, and insulation losses by the frequency. The measure of attenuation is expressed in decibel/foot at sine wave frequencies and by the slope change of the rise time at pulse type signals.

The shape of a selected pulse rise time (1,5, or 10 nanoseconds, etc.) may be matched by the ascending half of an equivalent sine wave frequency through a two channel oscilloscope. Such measurements showed good agreement with the following formula:

$$t_r=0.295/f_o$$

where $t_r$=pulse rise time 10% to 90%, seconds
$f_o$=corresponding frequency, in Hz

SINE WAVE ATTENUATION

Conductor losses may be expressed by the following formula:

$$A_c = 0.75(f_{MHz})/Z_d d$$

where:

$A_c$ = attenuation of the copper conductor, dB/100 ft.

$Z_d$ = characteristic impedance of cable, ohms d = diameter of copper conductors, inches The formula for insulation losses:

$$A_d = 2.78(\epsilon)\, D_f f_{MHz}$$

where:

$A_d$ = attenuation of the insulation, decibel/100 ft.

$\epsilon$ = dielectric constant, relative to air $D_f$ = dissipation factor

The calculated attenuation for the prototype cable in decibel/100 ft. units:

| Frequency in MHz | 10 | 100 | 1000 |
|---|---|---|---|
| $A_c = (1.327)(f_{MHz})$ | 4.20 | 13.27 | 42.0 |
| $A_d = (0.008)\, f_{MHz}$ | 0.08 | 0.08 | 8.0 |
| $A_f =$ | 4.28 | 14.07 | 50.0 |

FIG. 7 shows the calculated and measured Sine Wave attenuation values on the prototype cable (CA-490).

PULSE RISE TIME ATTENUATION

Both the edge and magnitude of the pulse are attenuated through a length of signal transmission line. These losses are due to the cable conductors and insulator, and will become evident by comparing the input and output shape of the pulse. In a given cable these losses are affected by the input rise time of the pulse and also by the length of cable.

To calculate the rise time attenuation a formula was developed for coaxial cables:

$$T_o = 4.56(10)^{-7}\,(A_o^2/f_o)l^2$$

where:

$T_o$ = time in seconds, needed for the output pulse to reach the 50 percent reference level of the input rise time $A_o = A_c + A_d$ in decibel/100 Ft. units $f_o = 0.295/t_r$; frequency in Hz l = length of cable in feet $t_r$ = input pulse rise time in seconds.

This formula applies to a theoretically vertical pulse edge or at least to a very fast pulse rise time. In practice, however, it is necessary to deal with 1 or 5 nanosecond rise time pulses. When the actual input rise time is comparable or slower than this calculated rise time attenuation of the cable, both should be considered. Referring to the tabulation of FIG. 6, with $t_r = 5$ nanosecond pulse input, the output rise time based on the $T_o$ calculation is only 2.515 nanoseconds. It is obvious, however, that when the cable is input with a pulse edge of 5 nanoseconds, the output should be at least 5 nanoseconds, but cannot be less. Consequently, it seems necessary that the actual input rise time would be accounted for in the calculations. Using this method for predictions, a reasonable agreement can be found to the actual measurements. FIG. 4 is a tabulation showing the calculation of $T_o$. FIG. 5 is a tabulation showing the schedule of the different amplitude levels of the actual input pulse, normalizing the 10–90% rise time for the tabulation of FIG. 4.

The prototype cable CA-490 was tested for rise time attenuation with three different pulse rise times:

0.18 nanoseconds 1.0 nanoseconds 5.0 nanoseconds

Results are shown in the tabulation of FIG. 6 in comparision with the calculated values.

LINE-TO-LINE INTERFERENCE (CROSSTALK)

Bundled twisted pairs, triplets and conventional multi-signal flat cables generally give no particular difficulties with certain transmission line parameters, such as characteristic impedance, propagation velocity or attenuation; however, line-to-line interference or crosstalk becomes a problem with fast rise time pulses or high frequency signals; for such signals coaxial cables are used at present for adequate overall performance.

In describing crosstalk between closely located signal transmission lines, the generally used terminology throughout the industry is:

1. Signal line: consists of signal and ground conductors;
2. Active line: conducting signal line;
3. Quiet line: nonconducting signal line;
4. Near End crosstalk: interference measured in Quiet line at the end where signals enter the Active line;
   4a. with pulsed signals: Fast crosstalk and peak crosstalk;
   4b. with sinusoidal signals: the maximum level;
5. Far End crosstalk: interference measured in the Quiet line at the load end of the Active line;
   5a. with pulsed signals: Differential crosstalk; peak crosstalk
   5b. with sinusoidal signals: the maximum level;
6. Fast crosstalk; reaches maximum magnitude when twice the propagation time of Quiet line is greater than input pulse rise time: this is a miniature replica of the input pulse; the width is equal to twice the propagation time of the Quiet line; same polarity as the input signal;
7. Peak Near End crosstalk: develops generally at the end of the Fast crosstalk; may be caused by fringing field effect or termination mismatch;
8. Differential crosstalk: spike shaped, opposite polarity than the input pulse; magnitude depends on fringing field effect at the cable's outskirt and on the length of cable;
9. Peak Far End crosstalk: either polarity;
10. Matched-terminated: the output impedance of the generator (pulse or signal) is matched to the characteristic impedance of the Active line (lines);

The input impedance of the measuring instrument (oscilloscope) is matched to the characteristic impedance of the signal line being tested (Active or Quiet); all other signal lines are terminated to loads equal to their characteristic impedances.

In conventional multi-signal transmission line cables the Differential Far End crosstalk causes the highest level of interference; at the same time this is the area where the composite multi-signal transmission line cable of the subject invention is most effective. To study the differences, test results on the prototype cable (CA-490) were compared to those measured on a basic polyethylene cable core (CA-489); the latter may be considered a good quality conventional flat cable. FIG. 8 shows oscilloscope traces of the crosstalk at the Quiet line output measured by utilizing the following pulse rise times: 0.18, 1, 2, 5 and 10 nanoseconds consecutively for the Active line input signal. For this test one Active line was driven adjacent to the Quiet line. This condition offers an optimum fidelity and clarity for obtaining and studying shapes of different crosstalk pictures because the characteristic impedance of the cable specimen can be matched to the impedances of the Pulse Generator and Oscilloscope (50 ohms) without special network means. The improvement exhibited by the jacketed, composite multi-signal transmission line cable of the subject invention may be concluded by the following tabulation:

| | Crosstalk in Percent | | |
|---|---|---|---|
| $t_r$ nsec. | Basic Polyethylene CA-489 | Prototype Cable CA-490 | Improvement |
| 10 | 0.3 | 0.05 | 6 times |
| 5 | 0.6 | 0.1 | 6 times |
| 2 | 1.5 | 0.1 | 6 times |
| 1 | 3.0 | 0.5 | 6 times |
| 0.18 | 8.6 | 1.1 | 7.8 times |

FIG. 8 is a representation of actual photographs showing far end crosstalk with each of the five different pulse rise times on both pictures. On CA-489, the base lines are aligned for easier reading. The crosstalk control is clearly visible in the reduction of the spikes and are most evident at the fast rise time pulses.

The reason for this crosstalk reduction is the physical difference between the basic polyethylene cable CA-489 and the prototype cable CA-490; i.e., the jacket. The latter makes the cable thicker and it also has a higher dielectric constant and higher dissipation factor than the polyethylene cable core.

A reasonable question arises; was the crosstalk reduced by the thicker cable or by the different dielectric? For an answer to this query, another cable (CA-580) was built with a polyethylene jacket around the basic polyethylene cable core with dimensions identical to the prototype cable CA-490. The Far End crosstalk measured on this specimen is shown in FIG. 9.

Comparing these measurements to the previous two cables, the following conclusions may be reached:

1. Far End crosstalk improved with the thicker polyethylene cable (CA-580) compared to the thinner one (CA-489). However, the composite multi-signal transmission line cable of the subject invention utilizing different dielectric materials confined the crosstalk far greater.

2. The differential spike (opposite polarity than the signal pulse) at fast rise time pulses still characterizes the thicker polyethylene cable, while the same is diminishing in the composite multi-signal transmission line cable of the subject invention (with $t_r$=0.18 nsec., it is 2.6 percent in cable CA-580, while only 0.5 percent in prototype cable CA-490).

For the 10 foot prototype cable, the Near End crosstalk was measured with one Active line adjacent to the Quiet Line.

The above tests clearly demonstrate the crosstalk controlling features of the multi-signal transmission line cable of the subject invention. However, for quantitatively worst case results, tests were made driving four Active lines (two at each side of the Quiet line) on 10-foot and 50-foot long prototype cables. In each instance, the performance of the cable made according to the teachings of the subject invention were substantially better than conventional flat cable transmission lines.

It is the inventor's conclusion that the construction of the subject multi-signal transmission line cable, and in particular, the difference in the dielectric constants of the insulated jacket and the core material results in the extremely desirable electrical characteristics. The inventor is not apprised of a definitive explanation at this time as to why the provision of an outer jacket having a higher dielectric constant provides the surprising and unusual, and extremely desirable result, of reducing the differential far end crosstalk on adjacent quiet lines, when a fast rise time pulse is applied to an active signal line. It is believed that the basic TEM mode in its ideal form is affected adversely by the surrounding air at the boundaries of conventional multi-signal flat cables causing "Differential" cross-talk in the adjacent signal lines at the far end of the cable. Differential crosstalk is created by the transients (leading edge, trailing edge) of a pulse and always has a polarity opposite to the direction of the swing in the Active line pulse. The magnitude of the Differential crosstalk is increased by both: faster transient times; and length of cable. The term "first mode" of propogation may be used to describe this air-affected fringing mode.

The jacket of the invention alters this harmful "first mode" of propogation by changing the character and magnitude of the "Differential" crosstalk. The term "Second mode" of propogation may be used to describe the propogation of the subject jacketed cable. It is theorized that the higher dielectric constant of the insulator jacket may effectively prevent or effectively the nature of the "first mode" propogating fringing field of the input pulse signal so as to substantially cause attenuation of the far end crosstalk in the adjacent signal line.

It is believed that the provision of the higher dielectric constant outer jacket may excite a "second mode" of propogation in the Active signal line, and that may be of an opposite polarity to the interference or crosstalk created by the "first mode" electromagnetic field, whereby the resulting effect on the adjacent Quiet line at the far end is a substantially reduced far end crosstalk level.

Stated differently, the construction of the subject composite multi-signal transmission line cable, and specifically the arrangement of the higher dielectric outer jacket, may excite a second mode of propogation. The effect of this "second mode" on the adjacent quiet line may be of a positive interference or crosstalk effect, whereas the "first mode" crosstalk may be of a negative value, whereby the total of the impositions of the first and second modes on the adjacent quiet line is either a cancellation or a substantially reduced crosstalk signal which is below the allowable limits for operation of the circuitry.

It is anticipated that further experimentation may yield a definative answer as to the operation of the system. Nonetheless, it has been positively determined, that this specific construction of a flat cable encased in an insulation of a higher dielectric material than the core material provides extremely beneficial electrical characteristics and, when the outer jacket is made of certain desirable materials such as vinyl, it additionally provides mechanical properties which greatly enhance and increase the value of the resulting transmission line cable.

It is noted that the desirable characteristics of the subject composite cable appear to be further enhanced by the selection of insulation materials which provides that the lossiness or dissipation factor (i.e., the property of a dielectric material to dissipate energy) of the inner core material 13 is less than the lossiness or dissipation factor of the insulator jacket 16.

It is understood that the present invention is susceptible to various modifications, changes and adaptations, and the same are intended to be comprehended within the meaning and range of equivalence of the appended claims. For example, it is readily apparent that other dielectric materials may be employed in the subject invention, with the one limitation being that the other insulator jacket have a higher dielectric constant than the inner core material in which the conductors are embedded. Furthermore, although the invention has been described with respect to alternating flat and round conductors, it is also readily apparent that other conductor configurations, for example, two rectangular-shaped conductors interposed between adjacent round conductors, may also be employed, in which case the parameters "w" "s" and "p" will be adjusted accordingly. The parameter "w" would be the combined width of the several flat conductors disposed between the round signal conductors, whereas the parameters "s" would be the spacing between the signal conductor and the nearest rectangular conductor. Furthermore, the parameter "p" would likewise be the spacing between a signal conductor and the adjacent imaginery ground conductor disposed withih the adjacent flat conductor. Also, the composite multi-signal transmission line cable of the subject invention may be constructed so as to include only round conductors. Likewise, the conductors of the subject multi-signal transmission line cable may take the form of a plurality of generally parallel conductors made up of twisted pairs or twisted triplets, in which case the multi-component conductors will be embedded in a core having a lower dielectric constant, about which is disposed an insulator jacket made of a material having a dielectric constant greater than the dielectric constant of said inner core.

It has been empirically determined that the combined thickness of the jacket is preferably approximately two-thirds of the thickness of the cable core which is capable of confining within its cross-sectional area approximately 98 percent of the TEM field. Stated differently, the combined thickness (i.e. above and below the cable core) of the jacket should be $\frac{2}{3}$ of the thickness of the hypothetical cable core capable of confining 98 percent of the TEM field, in those instances where the thickness of the cable core is insufficient to confine 98 percent of the TEM field.

What is claimed is:

1. A composite multi-signal transmission line cable for transmitting fast rise time electrical pulses with minimum far-end crosstalk comprising:

a flat multi-conductor cable including a plurality of generally parallel conductors embedded in a planar sheet of insulation material having a dielectric constant, *adjacent conductors being spaced apart at a predetermined pitch* with selected conductors adapted to be connected to ground, while remaining conductors are used as signal-carrying conductors *the ratio of the thickness of the insulation material to said pitch being at least 2.0 such that at least about 98 percent of the transverse electromagnetic (TEM) field propagates within said insulation material*; and an insulator jacket surrounding the flat multi-conductor cable and in intimate contact with said insulation material; said insulator jacket being made of a dielectric material having a dielectric constant greater than the dielectric constant of said insulation material whereby the electrical effect of the composite of the insulation material and the insulator jacket is to establish a balance between the inductive and capacitive coupling coefficients between adjacent signal-carrying conductors thereby minimizing the far-end cross-talk.

2. A composite multi-signal transmission line cable as in claim 1 wherein the insulation material is polyethylene, and the insulator jacket is made of vinyl.

3. A composite multi-signal transmission line cable as in claim 1 wherein the flat cable includes alternating flat and round conductors, with the round conductors being the signal carrying conductors, and wherein the characteristic impedance of the cable ($Z_d$) is expressed by the following relationship:

$$[Z_d=(1/\sqrt{\epsilon})\,42\cosh^{-1}(1.8\times^2-(1.25\times^2-1))]$$
$$Z_d=1/(\epsilon)^{\frac{1}{2}}\,42\cosh^{-1}(1.8\times^2-(1.25\times^2-1)^{\frac{1}{2}})$$

where d = diameter of round conductors;

p = spacing between a round conductor and an imaginary round conductor falling within the confines of the adjacent flat conductor;

x = p/d; and $\epsilon$ = relative dielectric constant of insulation dielectric material to air dielectric.

4. A composite multi-signal transmission line cable as in claim 1 wherein the signal conductors are round in cross-section, while the ground conductors are rectangular in cross-section.

5. A composite multi-signal transmission line cable as in claim 1 wherein the insulator jacket is extruded over the flat cable.

[6. A composite multi-signal transmission line cable as in claim 1 wherein the thickness of the jacket is approximately two-thirds that thickness of a theoretical cable core capable of confining approximately 98 percent of the TEM field.]

7. A composite multi-signal transmission line cable as in claim 4 wherein the insulator jacket is bonded to the flat cable.

8. A composite multi-signal transmission line cable as in claim 1 wherein the total thickness of the insulation material of the flat cable is sufficient to contain substantially all of the transverse electromagnetic field area generated by a signal passing through a conductor.

9. A composite multi-signal transmission line cable as in claim 1 wherein the insulator jacket is made of a material which is self-extinguishing when exposed to a flame.

10. A composite multi-signal transmission line cable for transmitting fast rise time electrical pulses with minimum far-end crosstalk comprising:

a flat multi-conductor cable including a plurality of generally parallel conductors alternating in cross-section between round and rectangular, and embedded in a planar sheet of insulation material having a dielectric constant and a low dissipation factor, *the center to center distance between a round conductor and the center of an imaginary round conductor tangent with the facing wall of an adjacent*

*rectangular conductor defining a pitch therebetween, the ratio of the thickness of the insulation material to said pitch being at least 2.0 such that at least about 98 percent of the transverse electromagnetic (TEM) field propagates within said insulation material*; and an insulator jacket extruded over said flat cable, and completely surrounding and in direct contact with said flat cable, said insulator jacket being made of a material having a dielectric constant greater than the dielectric constant of said insulation material, whereby the electrical effect of the composite of the insulation material and the insulator jacket is to establish a balance between the inductive and capacitive coupling coefficients between adjacent signal-carrying conductors thereby minimizing the far-end cross-talk.

11. A composite multi-signal transmission line cable as in claim 10 wherein the insulation material is made of polyethylene, and the insulator jacket is formed of vinyl.

12. A composite multi-signal transmission line cable as in claim 10 wherein the characteristic impedance ($Z_d$) of the cable is expressed in the following relationship:

[$Z_d=(1/\sqrt{\epsilon})\ 42\ \cosh^{-1}(1.8\times^2-(1.25\times^2-1))$]

$Z_d=1/(\epsilon)^{\frac{1}{2}}42\ \cosh^{-1}(1.8\times^2-(1.25\times^2-1)^{\frac{1}{2}})$ where d=diameter of round conductors;

p=spacing between a round conductor and an imaginary round conductor falling within the confines of the adjacent flat conductor;

x=p/d; and $\epsilon$=relative dielectric constant of insulation dielectric material to air dielectric.

[13. A composite multi-signal transmission line cable as in claim 10 wherein the thickness of the jacket is approximately two-thirds that thickness of a theoretical cable core capable of confining approximately 98 percent of the TEM field.]

14. A composite multi-signal transmission line cable as in claim 10 wherein the insulator jacket is formed of a material which is self-extinguishing.

15. A composite multi-signal transmission line cable as in claim 10 wherein the insulator jacket is bonded to the insulation material.

16. A composite multi-signal transmission line cable as in claim 10 wherein the dissipation factor of the dielectric material of the insulator jacket is greater than the dissipation factor of the insulation material of the flat cable.

* * * * *